Patented Aug. 11, 1942

2,292,393

UNITED STATES PATENT OFFICE 2,292,393

MOISTUREPROOF SHEET WRAPPING MATERIAL

James A. Mitchell, Kenmore, N. Y., assignor to E. I. du Pont de Nemours & Company, Wilmington, Del., a corporation of Delaware No Drawing. Application August 1, 1939, Serial No. 287,743

13 Claims. (Cl. 260—17)

This invention relates to moistureproof sheet wrapping material, and more particularly to the moisture-proofing of regenerated cellulose film and the like. It especially appertains to moistureproofing coating compositions giving greatly increased moistureproofness.

Recently there has appeared on the market a transparent moistureproof sheet wrapping material consisting of a base sheet of regenerated cellulose film coated with a moistureproofing coating composition. The combination of requirements necessary for a wrapping material of this character makes the compounding of the moistureproofing compositions an extremely complex and difficult procedure. It is necessary first of all that the wrapping material exhibit a high degree of moistureproofness in order to be able to compete with metal foils and the like. Since the public has come to look with great favor upon transparent wrapping material, "glass-clear transparency" is an important requirement. Furthermore it is essential that the wrapping tissue be completely flexible. It follows that flexing and creasing of such tissue must not result in the impairment of either the moistureproofing properties or the appearance of the wrapping sheet. Since the simple principles of lacquer compounding have been of practically no assistance in the formulation of such compositions, the moistureproofing of transparent cellulosic film is essentially a new art.

An important type of moistureproofing coating composition is disclosed in United States Patent No. 1,737,187 (Charch and Prindle). It comprises a cellulose derivative film former (such as cellulose nitrate), a moistureproofing agent (such as paraffin wax), a blending agent (such as ester gum) for the film former and moistureproofing agent, and, optionally, a plasticizer. It has now been found that the presence of one or more polymeric methacrylates greatly enhances the moistureproofness of such compositions. These polymeric materials, when employed as promoters, cause the moistureproofing effect to be increased sometimes as much as twenty-fold. This discovery of a simple addition material (for a moistureproofing coating composition) which greatly enhances the moistureproofness without adversely affecting the other desirable properties of the sheet wrapping material, was most surprising.

This invention had for an object the preparation of highly moistureproof coating compositions. A further object was to provide moistureproofing coating compositions which were highly transparent and flexible. Still further objects were the preparation of moistureproofing coating compositions containing a moistureproofing promoter having film forming properties, and the preparation of regenerated cellulose film having a moistureproofing coating containing cellulose nitrate as a film former, paraffin wax as a moistureproofing agent, ester gum as a blending agent, and a methacrylate ester polymer as a moistureproofing promoter. Yet further objects were to improve the moistureproofness of cellulose derivative coatings wax, and to provide a flexible transparent wrapping tissue moistureproofed with a moistureproofing composition comprising as a film former both a cellulose derivative and a polymeric methacrylate ester in which the esterifying group was from an alcohol containing from 3 to 6 carbon atoms. A general advance in the art, and other objects which will appear hereinafter, are also contemplated.

In carrying out this invention, a polymer of a methacrylate ester material of the formula:

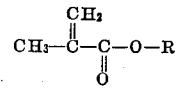

in which R represents an aliphatic group (the term being used generically to cover both alkyl and cyclo-alkyl groups, residues, radicals and nuclei) containing 3 to 6 carbon atoms, is incorporated in a moistureproofing coating composition of the type described above. The new moistureproofing compositions comprise essentially a cellulose derivative film former, a wax (the term being used generically to include waxlike materials), a moistureproofing agent, blending agent for the various ingredients, a methacrylate ester promoter, and optionally, a plasticizer. That such a composition would give improved moistureproofness was quite unexpected, because methacrylate esters have not heretofore been known to contribute materially to the moistureproofness of this type of composition. The usual observation has been that the moistureproofness of this type of composition is directly related to the wax constituent. The discovery was all the more surprising because these polymeric methacrylate esters do not flexibilize cellulose derivative film formers to such an extent that they can be considered as having a plasticizing action, and because they do not blend the moistureproofing agent and the cellulose derivative film forming agent. In other words, the functions of a plasticizer or blending agent cannot be ascribed to them.

From the following description and specific examples, in which are disclosed certain embodiments of the invention as well as details of what is believed to be the best mode for carrying out the invention, it will be apparent how the foregoing objects and related ends are accomplished. The parts are given by weight throughout the application.

*Example I*

| Ingredients | Percent | Control, percent |
|---|---|---|
| i-Propyl methacrylate polymer | 25 | 0 |
| Nitrocellulose (11.6% N) | 25 | 25 |
| Paraffin wax (M. P. 60° C.) | 3 | 3 |
| Dibutyl phthalate | 10 | 10 |
| Ester gum | 37 | 62 |
| Permeability value | 110 | 200 |

*Example II*

| Ingredients | Percent | Control, percent |
|---|---|---|
| n-Propyl methacrylate polymer | 25 | 0 |
| Nitrocellulose (11.6% N) | 25 | 25 |
| Paraffin wax (M. P. 60° C.) | 3 | 3 |
| Dibutyl phthalate | 10 | 10 |
| Ester gum | 37 | 62 |
| Permeability value | 60 | 200 |

*Example III*

| Ingredients | Percent | Control, percent |
|---|---|---|
| n-Butyl methacrylate polymer | 25 | 0 |
| Nitrocellulose (11.6% N) | 25 | 25 |
| Paraffin wax (M. P. 60° C.) | 3 | 3 |
| Dibutyl phthalate | 10 | 10 |
| Ester gum | 37 | 62 |
| Permeability value | 20 | 200 |

*Example IV*

| Ingredients | Percent | Control, percent |
|---|---|---|
| n-Butyl methacrylate polymer | 40 | 0 |
| Nitrocellulose (11.6% N) | 25 | 25 |
| Paraffin wax (M. P. 60° C.) | 3 | 3 |
| Dibutyl phthalate | 7 | 10 |
| Ester gum | 25 | 62 |
| Permeability value | 10 | 200 |

*Example V*

| Ingredients | Percent | Control, percent |
|---|---|---|
| Cyclo-hexyl methacrylate polymer | 25 | 0 |
| Nitrocellulose (11.6% N) | 25 | 25 |
| Paraffin wax (M. P. 60° C.) | 3 | 3 |
| Dibutyl phthalate | 10 | 10 |
| Ester gum | 37 | 62 |
| Permeability value | 10 | 200 |

*Example VI*

| Ingredients | Percent | Control, percent |
|---|---|---|
| Methacrylate polymer (60% n-butyl+40% methyl interpolymer) | 25 | 0 |
| Nitrocellulose (11.6% N) | 25 | 25 |
| Paraffin wax (M. P. 60° C.) | 3 | 3 |
| Dibutyl phthalate | 10 | 10 |
| Ester gum | 37 | 62 |
| Permeability value | 80 | 200 |

*Example VII*

| Ingredients | Percent | Control, percent |
|---|---|---|
| Methacrylate polymer (80% n-butyl+20% ethyl interpolymer) | 25 | 0 |
| Nitrocellulose (11.6% N) | 25 | 25 |
| Paraffin wax (M. P. 60° C.) | 3 | 3 |
| Dibutyl phthalate | 10 | 10 |
| Ester gum | 37 | 62 |
| Permeability value | 50 | 200 |

*Example VIII*

| Ingredients | Per cent | Control, per cent |
|---|---|---|
| n-Butyl methacrylate polymer | 25 | 0 |
| Nitrocellulose (11.6% N) | 32 | 57 |
| Paraffin wax (M. P. 60° C.) | 4 | 4 |
| Dibutyl phthalate | 24 | 24 |
| Dammar resin | 15 | 15 |
| Permeability value | 40 | 600 |

*Examples IX, X, XI,*

| Ingredients | Per cent | Per cent | Per cent |
|---|---|---|---|
| n-Propyl methacrylate polymer | 0 | 40 | 0 |
| i-Butyl methacrylate polymer | 0 | 0 | 50 |
| n-Butyl methacrylate polymer | 40 | 0 | 0 |
| Nitrocellulose (11.6% N) | 29 | 29 | 19 |
| Paraffin wax (M. P. 60° C.) | 6 | 6 | 6 |
| Ester gum | 25 | 25 | 25 |
| Permeability value | 10 | 150 | 30 |

*Example XII*

| Ingredients | Per cent |
|---|---|
| n-Butyl methacrylate polymer | 75 |
| Ethyl cellulose (organic solvent soluble) | 15 |
| Dibutyl phthalate | 2 |
| Paraffin wax (M. P. 60° C.) | 3 |
| Ester gum | 5 |

*Example XIII*

| Ingredients | Per cent | Control, per cent |
|---|---|---|
| Lauryl methacrylate polymer | 25 | 0 |
| Nitrocellulose (11.6% N) | 25 | 25 |
| Paraffin wax (M. P. 60° C.) | 3 | 3 |
| Dibutyl phthalate | 10 | 10 |
| Ester gum | 37 | 62 |
| Permeability value | 75 | 200 |

*Example XIV*

| Ingredients | Percent | Control, percent |
|---|---|---|
| Lauryl-imide of methacrylic acid polymer | 25 | 0 |
| Nitrocellulose (11.6%—N) | 25 | 25 |
| Paraffin wax (M. P. 60° C.) | 3 | 3 |
| Dibutyl phthalate | 10 | 10 |
| Ester gum | 37 | 62 |
| Permeability value | 60 | 200 |

The lacquers in all of the examples except XII were applied as a 12% solids dispersion in 40% toluene, 58% ethyl acetate and 2% ethyl alcohol in an amount equivalent to three grams of solids to both sides of a square meter of film. The solids composition of Example XII dissolves in toluene and in toluene-ethanol mixtures. The corresponding solutions were applied in the same manner as the other examples.

A comparison of Examples III and VIII indicates the extent to which n-butyl methacrylate polymer augments moistureproofness. Examples III and VIII controls are four component lacquers (wax, blending agent, plasticizer, and cellulose film former) containing no promoter. Substitution of 25% of the ester gum resin of Example III by this promoter improved moistureproofness ten-fold. Although part of the blending agent, the ester gum resin, is substituted with the polymeric methacrylate resin, the latter contributes nothing towards the blending action; the ester gum is in large excess over that required for blending and the reduction in concentration does not reduce it below the point of effective blending. Substitution of 25% of the nitrocellulose of Example VIII by promoter improves moistureproofness fifteen-fold.

Interpolymers of methacrylate esters which produce transparent coatings with those which produce hazy coatings, are good if the former predominates, as illustrated in Examples VI and VII.

Generally speaking, this invention pertains to the provision of moistureproofing coating compositions comprising polymeric methacrylate esters in combination with cellulose derivatives and moistureproofing agents such as waxes. Such compositions may also include plasticizing agents, drying or non-drying oils, additional resinous materials of either the natural or synthetic varieties, coloring agents, either as dyes or pigments or other modifying agents according to the type of coating composition preferred. Proportions of the ingredients may be varied within wide limits, depending on the properties desired in the finished coating. The total film constituents, for convenience referred to as total solids, may be varied according to the build to be obtained; the plasticizer will assist in obtaining suitable flexibility and other constituents will affect other properties. Coating compositions also include solvents and solvent mixtures which are adapted to the purposes of the coating composition and the method of applying the coating composition to the desired base can be adjusted in accordance with the practices of one skilled in the art.

The details of the preparation and the properties of methacrylate ester polymers per se do not form a part of the present invention and there is therefore no need to burden this specification therewith.

The methods of polymer preparation set forth in the art will be found useful in preparing the polymers for the practice of the present invention. In general, the degree of hardness of these materials is determined by the extent to which they have been polymerized. The completely polymerized methacrylates are usually preferred.

As will be clear from the preceding examples, the lauryl methacrylate polymers, and the lauryl methacrylate acid imide polymers, promote materially the moistureproofness of the resulting compositions. The employment of such methacrylate ester polymers in which the ester group contains more than six carbon atoms is, however, restricted because of a tendency for the resulting moistureproofing coating to blush. The difficulty of eliminating haze when methyl methacrylate polymers and ethyl methacrylate polymers are employed hinders or prevents the use of polymers in which the ester group contains less than 3 carbon atoms. In general the moistureproofness of the films embodying methacrylate ester polymers in which the ester group contains 3, 4, 5 or 6 carbon atoms is superior to those in which the other methacrylate ester polymers are employed. The presence of between 2 and 7 carbon atoms in esterifying alcohol radical is therefore somewhat critical. Present indications are that iso-butyl, normal-butyl and cyclohexyl-methacrylate polymers give the best moistureproofing promoting action, together with excellent transparency. For this reason they are preferred to the other methacrylate ester polymers. The other members of the 3 to 6 carbon atom group, namely, the iso-propyl, normal-propyl and the various amyl and hexyl esters, are excellent for the purpose indicated.

Variation is permissible in the cellulose derivative used as the film former. The cellulose esters such as cellulose nitrate, which is very useful, and cellulose acetate, which is of limited compatibility, are particularly suitable. Cellulose ethers may be employed, particularly glycol cellulose, ethyl cellulose and benzyl cellulose. Mention may also be made of the mixed esters, the mixed ethers and ether-esters which include cellulose acetate nitrate, cellulose acetate propionate and ethyl cellulose nitrate. The cellulose derivative employed may be of various degrees of conversion, for example, cellulose nitrates of various nitrogen contents (such as 10.5% to 12.5% N) may be satisfactorily employed. The methacrylate polymers are compatible with cellulose nitrate in all proportions. The limited compatibility of other cellulose derivatives, such as ethyl cellulose, cellulose acetate and cellulose acetate propionate, must be taken into consideration when they are employed in the formulation.

The usefulness of the polymeric methacrylate esters is, therefore, not restricted to any one type of cellulose derivative, and the general properties remain relatively the same. A nitrocellulose of low nitrogen content will generally require more plasticizer than a high nitrogen nitrocellulose when a comparable permeability result is to be obtained.

Although paraffin wax having a melting point of 60° C., or paraffin wax hardened (when necessary) by the addition of carnauba and/or candelilla waxes, constitutes a preferred moistureproofing agent, it is possible to use other waxes or wax-like materials. Special mention may be made of ceresin, japan wax, palm wax, bees wax and Chinese insect wax. For certain purposes some of these above described substances may be too soft. Where their employment is especially desirable they may be mixed with harder waxes. Carnauba wax, candelilla and the harder synthetic waxes are especially suitable for this purpose. In some instances it is desirable to use only the harder waxes. The term "wax" as used throughout this specification and claims is intended to include both true waxes (high monohydric alcohol esters of higher fatty acids), wax-like materials (such as paraffin, petrolatum, chlorinated hydrocarbons, the so-called "synthetic waxes" and the like), and materials which have been shown in the art to be the equivalent of wax for purposes indicated.

In the preparation of moistureproofing coating compositions comprising a cellulose derivature and a wax, it is customary to include some material which will improve the compatibility of the cellulose derivative and the wax, and this material is frequently referred to as a blending agent. A wide range of materials is available for employment as the blending agent for the wax and film formers, as might be expected in the present state of the art. Especially suitable for this purpose are the resins such as the rosinates, the polyhydric alcohol polybasic acid resinous condensation products (alkyd resins), the vinyl derivatives, chlorinated diphenyl resin, soluble phenol formaldehyde resins and dammar, copal, kauri and the like. The ester gum of the examples may be replaced with "Beckacite 1110" with excellent results. This material is an ester gum-rosin and maleic acid glyceride mixture having a melting range of 119°–215° F. and an acid number of 17–22. It is commercially available, and is one of a series of related maleic anhydride modified ester gum resins which may be used in the coatings of this invention.

The plasticizer, as indicated in the above examples, may be used in varying amounts, or even eliminated entirely. Suitable plasticizing action is obtained with many substances (varying widely from a chemical standpoint), or mixtures thereof. In some instances the nature of the plasticizer will restrict its presence to a very small percentage. Especially suitable as plasticizers are tricresyl phosphate, dibutyl phthalate, dicyclohexyl-phthalate, di-(dimethyl-cyclo-hexyl) adipate and butyl-benzoyl-benzoate.

For the usual coating procedures it is desirable that the moistureproofing compositions be available in solution. Any of the organic liquid solvents and solvent mixtures familiar to the art may be utilized. Generally the composition applied to the film will contain a cellulose derivative solvent, a wax solvent, a solvent for the resinous blending agent and a solvent for the methacrylate ester polymer. The utilization of an organic liquid diluent is optional. The same solvent may serve both for the polymerized methacrylate ester and the other constituents. In many cases the cellulose derivative solvent is also a wax solvent. A mixture comprising 40% to 90% ethyl acetate, 10% to 50% toluene and the balance ethanol will usually be found to operate satisfactorily. Depending upon the amount and nature of the cellulose derivative and the wax, the amount and nature of respective components of the solvent mixture will vary. Specific satisfactory compositions are illustrated in the examples.

Although the compositions described herein were prepared primarily for the coating of regenerated cellulose sheets or films made by the viscose process, they are also satisfactory for regenerated cellulose by the cuprammonium process and other manufacturing technique. Sheeted cellulose ethers such as ethyl, benzyl and glycol cellulose, cellulose esters such as cellulose nitrate and cellulose acetate, gelatin, casein, and the like, may also be coated therewith advantageously. The coating compositions can also, with desirable results, be applied to parchment, chemically or mechanically treated or hydrated paper, tissue paper and the like. These compositions may even be applied to the surface of metal, wood, etc., to secure special effects.

The moistureproofing compositions described above may be converted to self-sustaining films having the solids composition set forth by casting from suitable solutions or other methods known to the art.

In the preparation of transparent moistureproof sheet wrapping material, the coating compositions described above may be applied to the desired base in accordance with methods known in the art. The solvent may be removed and the coating material subjected to an elevated temperature at least equal to the melting point of the wax, with the result that clear, transparent moistureproof film is obtained. The coating technique and apparatus for carrying out the same is disclosed in detail in United States Patents Nos. 1,826,696–7–8–9.

The employment of polymeric methacylate esters permits a reduction in the amount of plasticizer necessary. As will be apparent from Examples X, XI and IX, it is even possible (by taking advantage of the increased moistureproofness obtained by the promoting effect of the methacrylate ester polymer) to eliminate special plasticizers and still obtain satisfactory moistureproof coating compositions. Generally speaking, however, compositions with no plasticizer are not preferred because they are inferior as regards flexibility, appearance, etc.

It has been found that the best results are obtained by limiting the relative amounts of the several constituents. In the preferred compositions, the amount of cellulose derivative film former varies from 20% to 70% or more of the total solids, although in most instances 30% to 60% is preferable. The polmerized methacrylate ester resin is generally present in amounts from 25% to 60% (in order to obtain maximum moistureproofing effects in the resulting product); smaller amounts than 25% will be found beneficial and in special circumstances may be used to meet specific needs. These compounds have been found to blend extremely well with waxes suitable for moistureproofing, over a wide range of concentrations. The wax content of the moistureproofing compositions ordinarily vary from 0.5% or 1% to 10% or more. Usually about 4% is satisfactory, and greater or lesser amounts will be found desirable only for special needs. The ratio of wax to resin (the blending agent) may vary from 1:1.7 to 1:14. A proportion of 1:4 has been found generally to be a good combination. The amount of plasticizer may vary from none at all up to about 40% to 50% of the solids content of the composition. The ratio of plasticizer to cellulose derivative obviously depends upon the nature of the cellulose derivative, the nature and amount of the wax and the nature of the plasticizer itself. It has been found that a figure of 1:1.25 will produce very good results. An optimum ratio seems to be about 1:1.5.

The amount of solvent or solvent mixture may vary according to the composition, to the method of application and to the purpose desired to be accomplished. The viscosity of the coating composition may be controlled by the amount and nature of the solvent, and may be adjusted easily to adapt the solution for coating by brushing, spraying, dipping and other methods familiar to the art.

Moistureproof materials are defined in United States Patent No. 2,147,180 (Abben). In the interest of brevity the definitions are not repeated here. The terms related thereto and used herein are used in accordance with such definitions.

For the purpose of comparison and definitions, the following test has been used to measure the strength of the heat-seal bond. Two strips of the coated material 1½ inches wide are superimposed one on the other, so that opposite faces of the film are in contact. A seal is made across the width of the material at one end by placing the film on a metal plate heated to 130° C., and rolling thereover a roller ⅝ of an inch wide weighted for 650 grams. The two strips so sealed are opened at the free end and placed in a stretching device such as a Suter testing machine by gripping each end of the sheet in suitable clamps, one of which is fixed while the other is moved away at a constant speed of 12 inches per minute. The force in grams required to pull the sheets apart is taken as a measure of the heat-seal bond strength.

In addition to augmenting moistureproofness, the methacrylate ester polymers described above confer excellent anti-sticking properties upon the coating compositions. They also improve heat-sealability at high temperatures, thereby making them especially useful when employed in conjunction with wrapping tissues which are to be heat-sealed during wrapping operations. Heat-sealing is an important method of sealing packages at the present time. The product of Example VIII had a heat seal strength of 84.

By way of illustration there may be considered specifically those moistureproofing compositions comprising a cellulose derivative, a resin, a wax, and a plasticizer. A systematic study of these compositions reveals that with any given plasticizer concentration, a system may be obtained wherein, generally speaking, the presence of polymeric methacrylate resin esters produces greater moistureproofness than that obtaining in similar systems in the absence of these methacrylate esters.

It has been observed that moistureproof coatings containing polymeric methacrylate esters according to the present invention do not become tacky until a relatively higher temperature is reached than that observed in the absence of these esters. For example, a coating prepared in accordance with Example V will not adhere to a brass plate until a temperature of 90° C. is reached. The coating of a similar composition in which the cyclohexyl methacrylate polymer was replaced with dibutyl phthalate stuck to a brass plate at a temperature of 37° C. Moreover, the moistureproofness of the coating containing cyclohexyl methacrylate polymer was three times as good as that containing dibutyl phthalate and no promoter. This difference in the temperature at which these materials stick is of the greatest importance in the operation of automatic wrapping machinery and in the handling of wrapped articles.

Although coating compositions containing these methacrylate esters are observed to stick at a higher temperature than those coatings not containing them, the strength of the heat-seal bond obtained by the application of heat and pressure to film coated with these coating compositions is observed to be higher in the case of the compositions containing the methacrylate ester polymers. This is a distinct advantage where such methods of sealing the wrapping tissues are employed.

The addition of methacrylate ester polymers to coating compositions comprising a cellulose derivative and a wax, satisfactory for special purposes in all respects except the degree of moistureproofness, is a simple method of rendering completely acceptable compositions where a higher degree of moistureproofness is desired. In many cases this is a matter of very great importance. For example, after much experimentation a coating composition formulation may have been arrived at which is extremely transparent, flexible and durable, which adheres well to the base sheet, is non-toxic and non-odorless, which has the desired surface characteristics of slip, of not sticking in storage, of operating satisfactorily on wrapping machines (if the particular product is a sheet wrapping material), which has the desired degree of heat-seal ability, etc., but which in spite of all these desirable characteristics lacks the degree of moistureproofness required for some specific purposes. The addition of the methacrylate polymer to such a composition usually avoids the necessity for the tedious and expensive program of experimentation usually required to improve the properties of moistureproofness in the coating without disturbing the other desirable characteristics that the coating exhibits.

In another instance it may be found that a coating composition (for a sheet wrapping material of the type previously discussed) although sufficiently moistureproof will exhibit undesirable surface characteristics such as stickiness or tackiness, low heat-seal bond strength, etc., because of the presence of an excessive amount of plasticizer. Reduction of the amount of plasticizer in the film coating may materially impair the moistureproofness. By introducing methacrylate ester polymers, the moistureproofness of the product may be maintained or even improved, while at the same time the plasticizer content is reduced below the harmful concentration.

The plasticizer is used to improve the flexibility of the film. In the past where highly moistureproof compositions were desired, it was found practical to employ more plasticizer than was required to merely flexibilize the resulting coating. With the large amounts of plasticizer used in producing highly moistureproof coating compositions, the surface characteristics of the product are apt to suffer; that is, the surface may tend to be tacky, easily smeared or otherwise unsatisfactory. It is apparent, therefore, that any provision for decreasing the amount of plasticizer required, while still producing coating compositions which are highly moistureproof will contribute greatly to the advancement of the art. Polymerized methacrylate esters of the type above referred to are particularly well suited to the preparation of moistureproofing compositions containing waxes or wax-like substances. Furthermore, it has been found in accordance with the present invention, that the use of these polymerized methacrylates permits the reduction in the amount of plasticizer required to produce suitable moistureproofing coating compositions which will, when deposited in the form of a thin film or coating, result in flexible, transparent, moistureproof layers which are non-tacky, non-smeary, durable and adapted for application to various base materials.

The methacrylate ester polymers improve the anchorage of cellulose derivative coatings to regenerated cellulose. This improvement is sufficient to permit such wrapping tissues to be used for the wrapping of wet products such as butter, fish, cheese and the like which have a tendency to loosen the coating on the base sheet. Not only is it desirable that the coating on transparent sheeting, such as regenerated cellulose, be non-tacky and that it does not stick to other sheets and objects with which it may come in contact, but also that it be firmly adherent to the film upon which it is deposited. If this coating tends to become loose and peel off, that section of the film which loses its coating will no longer give adequate protection against the passage of vapors, and the material thus lost from the surface of the film may foul the apparatus, such as automatic wrapping machinery, giving rise to the spoilage of material, loss of time and operation and additional labor. It has been found that coating compositions which contain these polymeric methacrylate esters adhere to the film with great tenacity, thus minimizing these evils.

This is the first instance in which a material having attractive film-forming characteristics has been found to desirably increase the moistureproofness attainable by a moistureproofing coating composition.

As many apparently widely different embodiments of this invention may be made without departing from the spirit and scope thereof, it is to be understood that this invention is not limited to the specific embodiments thereof except as defined in the appended claims.

I claim:

1. A moistureproofing composition comprising essentially organic solvent soluble cellulose derivative film former, a wax moistureproofing agent, a resin blending agent, a polymer of a methacrylate having the formula:

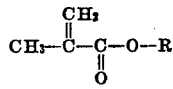

in which R is an alkyl group containing 3 to 6 carbon atoms and a plasticizer together with sufficient organic liquid solvent to make the composition fluid.

2. A moistureproofed sheet wrapping material comprising a water sensitive cellulosic film, and a moistureproofing coating comprising essentially organic solvent soluble cellulose derivative film former, a wax moistureproofing agent, a blending agent and a moistureproofing promoter, said promoter being polymeric methacrylate having the formula:

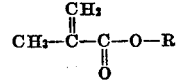

in which R is an alkyl group containing 3 to 6 carbon atoms.

3. A moistureproofed sheet wrapping material comprising a water sensitive cellulosic film, and a moistureproofing coating comprising essentially organic solvent soluble cellulose derivative film former, a wax moistureproofing agent, a blending agent, a plasticizer and a moistureproofing promoter, said promoter being polymeric methacrylate having the formula:

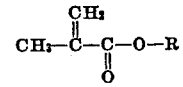

in which R is an alkyl group containing 3 to 6 carbon atoms.

4. The product of claim 2 when the film former is nitrocellulose.

5. The method of increasing the moistureproofness of a film comprising essentially organic solvent soluble cellulose substitution derivative film forming agent, a wax moistureproofing agent and a resin blending agent, which comprises incorporating polymeric methacrylate having the formula:

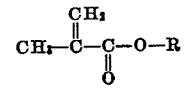

in which R is an alkyl group containing 3 to 6 carbon atoms in the film composition.

6. The method of increasing the moistureproofness of a film comprising essentially organic solvent soluble cellulose ester film forming agent, a wax moistureproofing agent and a resin blending agent, which comprises incorporating polymeric methacrylate having the formula:

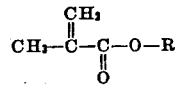

in which R is an alkyl group containing 3 to 6 carbon atoms in the film composition.

7. The method of increasing the moistureproofness of a transparent film comprising essentially cellulose nitrate, a wax moistureproofing agent and a resin blending agent, which comprises incorporating polymeric butyl methacrylate in the film composition.

8. A moistureproofing composition comprising essentially cellulose nitrate film former 20% to 70%, a wax moistureproofing agent 1% to 10%, a resin blending agent, a polymer of a methacrylate having the formula:

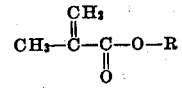

in which R is an alkyl group containing 3 to 6 carbon atoms 25% to 60% and a plasticizer together with sufficient organic liquid solvent to make the composition fluid, the said percentages being based on the total solids of the composition.

9. The method of increasing the moistureproofness of a transparent film comprising essentially cellulose nitrate, a wax moistureproofing agent and a resin blending agent, which comprises incorporating polymer of alkyl methacrylate, the alkyl group containing 3 to 6 carbon atoms, in the film composition.

10. A moistureproofing coating comprising essentially nitrocellulose, paraffin wax, dibutyl phthalate, ester gum and polymer of alkyl methacrylate ester, the alkyl group containing 3 to 6 carbon atoms.

11. A moistureproof film comprising essentially:

| | Per cent |
|---|---|
| n-Butyl methacrylate polymer | 25 |
| Nitrocellulose (11.6% N) | 25 |
| Paraffin wax (M. P. 60° C.) | 3 |
| Dibutyl phthalate | 10 |
| Ester gum | 37 |

12. A moistureproof film comprising essentially:

| | Per cent |
|---|---|
| n-Butyl methacrylate polymer | 40 |
| Nitrocellulose (11.6% N) | 25 |
| Paraffin wax (M. P. 60° C.) | 3 |
| Dibutyl phthalate | 7 |
| Ester gum | 25 |

13. A moistureproof film comprising essentially:

| | Per cent |
|---|---|
| Cyclo-hexyl methacrylate polymer | 25 |
| Nitrocellulose (11.6% N) | 25 |
| Paraffin wax (M. P. 60° C.) | 3 |
| Dibutyl phthalate | 10 |
| Ester gum | 37 |

JAMES A. MITCHELL.